United States Patent
Pung et al.

(10) Patent No.: US 9,204,775 B2
(45) Date of Patent: Dec. 8, 2015

(54) SCRUBBING STRIP FOR A CLEANING SHEET, CLEANING SHEET USED THEREWITH, AND METHOD OF MAKING

(75) Inventors: David John Pung, Loveland, OH (US); Sylvie Marguerite Linneman, Silverton, OH (US); George Junior Angelo Patrick, Springdale, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 164 days.

(21) Appl. No.: 13/289,331

(22) Filed: Nov. 4, 2011

(65) Prior Publication Data

US 2013/0111682 A1    May 9, 2013

Related U.S. Application Data

(63) Continuation-in-part of application No. 13/094,206, filed on Apr. 26, 2011, now Pat. No. 9,067,357, which is a continuation-in-part of application No. 13/094,477, filed on Apr. 26, 2011, now Pat. No. 9,044,353, which is a continuation-in-part of application No. 13/094,559, filed on Apr. 26, 2011, now Pat. No. 8,708,687, which is a continuation-in-part of application No. 13/094,593, filed on Apr. 26, 2011.

(51) Int. Cl.
| | |
|---|---|
| *A47L 13/10* | (2006.01) |
| *B32B 3/26* | (2006.01) |
| *B32B 3/30* | (2006.01) |
| *B32B 5/24* | (2006.01) |
| *A47L 13/16* | (2006.01) |
| *B29C 43/22* | (2006.01) |
| *B29C 43/46* | (2006.01) |
| *B32B 5/02* | (2006.01) |

(52) U.S. Cl.
CPC .............. *A47L 13/10* (2013.01); *A47L 13/16* (2013.01); *B29C 43/222* (2013.01); *B29C 43/46* (2013.01); *B32B 3/26* (2013.01); *B32B 3/30* (2013.01); *B32B 5/022* (2013.01); *B32B 5/24* (2013.01); *B29C 2043/463* (2013.01); *B32B 2262/0276* (2013.01); *B32B 2432/00* (2013.01)

(58) Field of Classification Search
CPC ............ A47L 13/10; B32B 3/26; B32B 3/30; B32B 5/022; B32B 5/24
USPC ............. 15/104.93, 104.94, 118, 228, 229.11
See application file for complete search history.

(56) References Cited

U.S. PATENT DOCUMENTS

| | | | |
|---|---|---|---|
| 2,835,911 A | 5/1958 | Mahmarian | |
| 3,656,202 A | 4/1972 | Paton | |

(Continued)

FOREIGN PATENT DOCUMENTS

| | | |
|---|---|---|
| CA | 2508110 | 7/2004 |
| FR | 2 822 045 A1 | 9/2002 |

(Continued)

OTHER PUBLICATIONS

U.S. Appl. No. 13/094,206, filed Apr. 26, 2011, Orr, et al.

(Continued)

*Primary Examiner* — Randall Chin
(74) *Attorney, Agent, or Firm* — Larry L. Huston; Steven W. Miller

(57) ABSTRACT

A scrubbing strip usable for cleaning a floor or other hard surface. The scrubbing strip may comprise a background and a matrix of outwardly-extending protrusions. The protrusions provide a surface topography suitable for reaching into grout lines and other recess of highly textured surfaces.

19 Claims, 5 Drawing Sheets

(56) References Cited

U.S. PATENT DOCUMENTS

| | | | |
|---|---|---|---|
| 3,929,135 A | 12/1975 | Thompson |
| 4,076,663 A | 2/1978 | Masuda et al. |
| 4,324,016 A | 4/1982 | Herbig |
| 4,515,703 A | 5/1985 | Haq |
| 4,864,675 A | 9/1989 | Jones |
| 5,037,409 A | 8/1991 | Chen et al. |
| 5,090,832 A | 2/1992 | Rivera et al. |
| 5,094,559 A | 3/1992 | Rivera et al. |
| 5,304,161 A | 4/1994 | Noel et al. |
| 5,334,176 A | 8/1994 | Buenger et al. |
| 5,360,420 A | 11/1994 | Cook et al. |
| 5,488,750 A | 2/1996 | Vosbikian et al. |
| 5,550,167 A | 8/1996 | DesMarais |
| 5,563,179 A | 10/1996 | Stone et al. |
| 5,569,521 A | 10/1996 | Francoeur et al. |
| 5,577,290 A | 11/1996 | Monahan |
| 5,639,532 A | 6/1997 | Wells |
| 5,671,498 A | 9/1997 | Martin et al. |
| 5,681,300 A | 10/1997 | Ahr et al. |
| 5,733,274 A | 3/1998 | Osborn |
| 5,771,524 A | 6/1998 | Woods et al. |
| 5,779,155 A | 7/1998 | Schennum et al. |
| 5,881,423 A | 3/1999 | Shumway et al. |
| 5,951,537 A | 9/1999 | Osborn |
| 5,960,508 A | 10/1999 | Holt et al. |
| 5,968,029 A | 10/1999 | Chappell et al. |
| 5,987,685 A | 11/1999 | Lambert |
| 6,003,191 A | 12/1999 | Sherry et al. |
| 6,013,349 A | 1/2000 | Takevchi et al. |
| 6,048,123 A | 4/2000 | Holt et al. |
| 6,101,661 A | 8/2000 | Policicchio et al. |
| 6,132,841 A | 10/2000 | Guthrie et al. |
| 6,227,145 B1 | 5/2001 | Miyamoto et al. |
| 6,242,074 B1 | 6/2001 | Thomas |
| 6,305,046 B1 | 10/2001 | Kingry et al. |
| 6,323,388 B1 | 11/2001 | Melius et al. |
| 6,380,151 B1 | 4/2002 | Masters et al. |
| 6,383,431 B1 | 5/2002 | Dobrin et al. |
| 6,436,080 B1 | 8/2002 | Carlucci et al. |
| 6,443,936 B1 | 9/2002 | Hamilton et al. |
| 6,485,822 B1 | 11/2002 | Osiecki et al. |
| 6,491,928 B1 | 12/2002 | Smith et al. |
| 6,507,972 B2 | 1/2003 | Hart |
| 6,565,547 B2 | 5/2003 | Bissah et al. |
| 6,601,261 B1 | 8/2003 | Holt et al. |
| 6,766,552 B1 | 7/2004 | Policicchio et al. |
| 6,807,702 B2 | 10/2004 | Keck et al. |
| 6,808,790 B2 | 10/2004 | Chen et al. |
| 6,842,936 B2 | 1/2005 | Policicchio et al. |
| 6,993,805 B2 | 2/2006 | Prodoehl et al. |
| 7,028,364 B2 | 4/2006 | Policicchio et al. |
| 7,033,965 B2 | 4/2006 | Takabayashi et al. |
| 7,225,496 B2 | 6/2007 | Prodoehl et al. |
| 7,228,586 B2 | 6/2007 | Prodoehl et al. |
| D551,409 S | 9/2007 | Pung et al. |
| 7,451,516 B2 | 11/2008 | Tanaka |
| 7,480,956 B2 | 1/2009 | Policicchio et al. |
| 7,506,397 B2 | 3/2009 | Tanaka |
| 7,516,510 B2 * | 4/2009 | Tanaka ............ 15/228 |
| 7,566,329 B2 | 7/2009 | Rosenfeld et al. |
| 7,624,468 B2 | 12/2009 | Reddy et al. |
| D614,408 S | 4/2010 | Koenig |
| 7,694,379 B2 | 4/2010 | Glaug |
| 7,753,897 B2 | 7/2010 | Rosenfeld et al. |
| 7,771,404 B2 | 8/2010 | Rosenfeld et al. |
| 7,803,726 B2 | 9/2010 | Policicchio et al. |
| 7,841,039 B1 | 11/2010 | Squire |
| 2001/0046407 A1 | 11/2001 | Kunkler et al. |
| 2002/0065012 A1 | 5/2002 | Takabayashi et al. |
| 2002/0100132 A1 | 8/2002 | McMullen et al. |
| 2002/0166573 A1 | 11/2002 | Policicchio et al. |
| 2002/0168216 A1 | 11/2002 | Policicchio et al. |
| 2003/0034050 A1 | 2/2003 | Policicchio et al. |
| 2003/0095826 A1 | 5/2003 | Policicchio et al. |
| 2003/0126708 A1 | 7/2003 | Blum et al. |
| 2003/0126709 A1 | 7/2003 | Policicchio et al. |
| 2003/0126710 A1 | 7/2003 | Policicchio et al. |
| 2003/0133740 A1 | 7/2003 | Policicchio et al. |
| 2004/0086320 A1 | 5/2004 | Policicchio et al. |
| 2004/0111817 A1 | 6/2004 | Chen et al. |
| 2004/0138634 A1 | 7/2004 | Litvay et al. |
| 2004/0154118 A1 | 8/2004 | Bohn |
| 2004/0161586 A1 | 8/2004 | Cree et al. |
| 2004/0206372 A1 | 10/2004 | Holt et al. |
| 2004/0231700 A1 | 11/2004 | Bell et al. |
| 2004/0237235 A1 | 12/2004 | Visiloi et al. |
| 2005/0022843 A1 | 2/2005 | Policicchio et al. |
| 2005/0076936 A1 | 4/2005 | Pung et al. |
| 2005/0081888 A1 | 4/2005 | Pung et al. |
| 2005/0120497 A1 | 6/2005 | Lynde et al. |
| 2005/0129897 A1 | 6/2005 | Zhou et al. |
| 2005/0198757 A1 | 9/2005 | Gavney et al. |
| 2005/0215459 A1 | 9/2005 | Policicchio et al. |
| 2005/0229344 A1 | 10/2005 | Mittelstaedt et al. |
| 2006/0135026 A1 | 6/2006 | Arendt et al. |
| 2007/0077403 A1 | 4/2007 | Litvay et al. |
| 2007/0094827 A1 | 5/2007 | Kilkenny et al. |
| 2007/0107151 A1 | 5/2007 | Pung et al. |
| 2007/0212965 A1 | 9/2007 | Smith et al. |
| 2008/0028560 A1 | 2/2008 | Policicchio et al. |
| 2008/0115303 A1 | 5/2008 | Gavney et al. |
| 2008/0295869 A1 | 12/2008 | Schriver et al. |
| 2009/0165228 A1 * | 7/2009 | Kilkenny et al. ......... 15/104.94 |
| 2010/0206327 A1 | 8/2010 | DiBono et al. |
| 2011/0256791 A1 * | 10/2011 | Seidel et al. ............ 442/329 |

FOREIGN PATENT DOCUMENTS

| | | |
|---|---|---|
| JP | 2002 119452 A | 8/2002 |
| WO | WO 99/18838 | 4/1999 |
| WO | WO 01/91606 | 12/2001 |
| WO | WO 02/090483 A2 | 11/2002 |
| WO | WO 2005/011936 | 2/2005 |
| WO | WO 2005/044552 | 5/2005 |
| WO | WO 2009/067403 | 5/2009 |

OTHER PUBLICATIONS

U.S. Appl. No. 13/094,477, filed Apr. 26, 2011, Stone, et al.
U.S. Appl. No. 13/094,559, filed Apr. 26, 2011, Stone, et al.
U.S. Appl. No. 13/094,593, filed Apr. 26, 2011, Coe, et al.
Examiners Answer for U.S. Appl. No. 11/601,238 dated Jul. 18, 2011, 11 Pages.
Office Action for U.S. Appl. No. 10/958,791 dated Mar. 4, 2009, 6 Pages.
Examiners Answer for U.S. Appl. No. 10/958,852 dated Jan. 14, 2010, 11 Pages.

* cited by examiner

SCRUBBING STRIP FOR A CLEANING SHEET, CLEANING SHEET USED THEREWITH, AND METHOD OF MAKING

FIELD OF THE INVENTION

The present invention relates to cleaning sheets and optionally to cleaning sheets usable with implements for cleaning hard surfaces, such as floors. More particularly, the present invention relates to scrubbing strips usable with such cleaning sheets.

BACKGROUND OF THE INVENTION

Disposable sheets are often used for cleaning a floor or other hard surfaces. Such surfaces include countertops, benches, shelving, etc. Such surfaces may particularly include hard floors, typically comprising wood, tile, linoleum, etc. While the following specification and claims are discussed in terms of a floor, one of skill will recognize the invention is not so limited, and may be used in conjunction with other hard surfaces.

To remove stains or soils from the floor a cleaning sheet may be pre-wetted or may be used with a cleaning solution separately applied to the floor. The cleaning sheet may be manually gripped by the user, or the cleaning sheet may be used with an implement, as is known in the art. The cleaning sheet may be removably attached to the implement and discarded when its useful life is depleted.

The useful life may encompass a single cleaning task. For example when a single room is cleaned or multiple rooms comprising enough debris and area to render the sheet unusable or usable to a reduced efficacy, the user may consider the useful life of the sheet is depleted. Once the useful life is depleted, the user may discard the sheet and replace it with a new one, as necessary. The sheet is typically not laundered or otherwise restored.

When more difficult stains or soiling of the floor are encountered, the user may wish to engage in more aggressive cleaning to remove such stain or soiling. For example, the user may apply more cleaning solution and/or allow the cleaning solution to have a longer residence time. But this approach may not be successful for all types of stains or soiling, e.g. those not water soluble.

Alternatively or additionally, the user may use a scrub brush to remove the stain or soiling. But using a scrub brush defeats the purpose of employing a disposable sheet for the cleaning task. The scrub brush must be found, brought to the task, and replaced in storage when the cleaning task is completed.

Accordingly, some disposable cleaning sheets are provided with scrubbing components to provide more aggressive cleaning. Different scrubbing components are known for this purpose. However, to be consumer accepted, the scrubbing component must be inexpensive, be usable with a disposable sheet, yet effective for difficult cleaning tasks.

One scrubbing component which has been judged to meet these competing criteria is a scrubbing strip. The scrubbing strip may overlie all or a portion of a floor-facing surface of the cleaning sheet. The scrubbing strip may have more stiffness, abrasiveness, rigidity, etc. than the balance of the cleaning sheet. The scrubbing strip may comprise a textured nonwoven or a textured polymeric film, as described below. A nonwoven web is described in commonly assigned U.S. Pat. No. 6,383,431 and a web-like material is shown in WO 2005/011936 published Feb. 10, 2005. A scrubbing strip and cleaning sheet usable therewith may be generally made according to commonly assigned D551,409 S, D614,408 S, 2005/0076936A1 published Apr. 14, 2005, 2005/0081888A1 published Apr. 21, 2005 and/or 2007/0107151A1 published May 17, 2007.

Yet other disposable pads and scrubbing products are shown in U.S. Pat. No. 5,090,832 issued Feb. 25, 1992 and CA 2,508,110, respectively.

However, such scrubbing strips have not proven entirely effective. For example, on highly textured surfaces, such as grout lines in tile, the scrubbing strip may not reach far enough into the texture to clean all of that surface. Even if the scrubbing strip reaches into the recesses, etc. of the texture, the scrubbing strip may not efficaciously clean it. The other properties of the scrubbing strip may not promote efficacious cleaning, despite the scrubbing strip having a relatively rough surface texture. Accordingly, the search for improved cleaning continues.

SUMMARY OF THE INVENTION

The invention comprises a scrubbing strip usable in conjunction with a cleaning sheet. The scrubbing strip has a plurality of outwardly extending protrusions. The protrusions have a surface roughness which provides efficacious cleaning on a hard target surface.

DETAILED DESCRIPTION OF THE INVENTION

Figure 1:
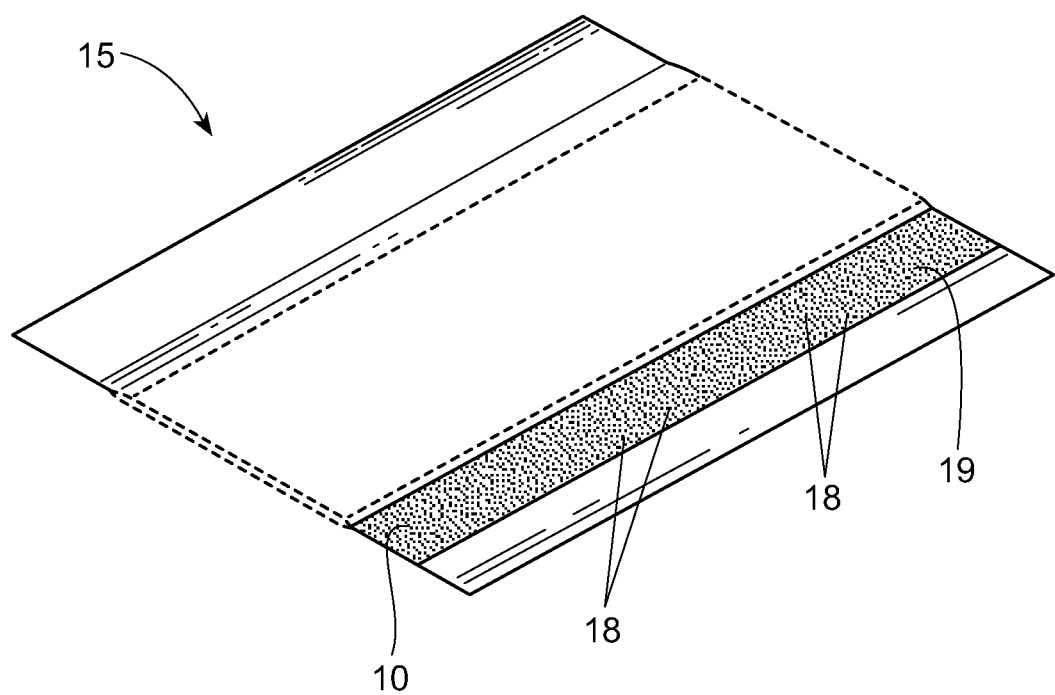
FIG. 1 is a perspective view of a cleaning sheet having a scrubbing strip according to the present invention.

Referring to FIG. 1, the scrubbing strip 10 of the present invention may be used in conjunction with a cleaning sheet 15. In a first embodiment, the cleaning sheet 15 may be pre-moistened. If the cleaning sheet 15 is pre-moistened, it is preferably pre-moistened with a liquid which provides for cleaning of the target surface, such as a floor, and does not require a post-cleaning rinsing operation.

A pre-moistened cleaning sheet 15 may comprise one or more layers of natural or synthetic fibers. The fibers may be hydrophilic, hydrophobic or a combination thereof, provided that the cleaning sheet 15 is generally absorbent to hold, and express upon demand, a cleaning solution. In one embodiment, the cleaning sheet 15 may comprise at least 50 weight percent or at least 70 weight percent cellulose fibers, such as air laid SSK fibers. If desired, the cleaning sheet 15 may comprise plural layers to provide for scrubbing, liquid storage, and other particularized tasks for the cleaning operation. Prophetically a sheet 15 usable with the scrubbing strip 10 of the present invention could comprise one or more layers of foam, sponge and/or formed film.

The cleaning sheet 15 may be loaded with at least 1, 1.5 or 2 grams of cleaning solution per gram of dry substrate, but typically not more than 5 grams per gram. The cleaning solution may comprise a surfactant, such as an alkylpolyglucoside APG surfactant which minimizes streaking since there is typically not a rinsing operation, agglomerating agents, buffering agents, disinfectants, antimicrobials, bleaching agents, enzymes, perfumes, secondary surfactants, etc. A suitable pre-moistened cleaning sheet 15 maybe made according to the teachings of commonly assigned U.S. Pat. Nos. 6,653,274; 6,716,805; D551,409 S and/or D614,408 S.

In a second embodiment, the cleaning sheet 15 may be used with a system that provides for independent application of the cleanser to the target surface, as occurs with a Swiffer® WetJet® implement or a separate spray bottle. Such a sheet 15 may comprise layers, to provide for absorption and storage of cleaning fluid deposited on the target surface. If desired, the cleaning sheet 15 may comprise an absorbent layer. The absorbent layer may comprise absorbent gelling materials to increase the absorbent capacity of the cleaning sheet 15. The absorbent gelling materials may be distributed within the cleaning sheet 15 in such a manner to avoid rapid absorbency and absorb fluids slowly, to provide for the most effective use of the cleaning sheet 15.

Such a cleaning sheet 15 may comprise plural layers disposed in a laminate. The floor sheet is the lowest, i.e. downwardly facing outer layer, and may comprise holes to allow for absorption of cleaning solution therethrough and to promote the scrubbing of the target surface. The intermediate layers may provide for storage of the liquids, and may comprise the absorbent gelling materials. This cleaning sheet 15 may have an absorbent capacity of at least 10, 15, or 20 grams of cleaning solution per gram of dry cleaning sheet 15 and other absorbent properties, as set forth in commonly assigned U.S. Pat. Nos. 6,003,191; 6,048,123 and 6,601,261.

A macro-apertured floor sheet has first and second opposed surfaces. The first surface may face outwardly from the cleaning sheet 15 in which the floor sheet is used.

The floor sheet may comprise from 5 to 20 holes per square centimeter, more particularly from 7 to 15 holes per square centimeter. The apertures may be tapered or funnel-shaped apertures, meaning that the diameter at the lower end of the aperture (i.e. closer to the surface to be cleaned) is greater than the diameter at the upper end of the aperture (i.e. closer to the absorbent layer(s)) and balance of the cleaning sheet 15. The apertures may provide a suctioning or capillary transport effect as the cleaning sheet 15 is moved across the surface being cleaned. The capillary transport effect aids in moving liquid from the surface being cleaned to other layer(s) of the cleaning sheet 15, such as the absorbent layer(s), if present. In addition, tapered or funnel-shaped apertures may provide resistance to reduce the occurrence of liquids passing back through the scrubbing strip 10 and onto to the surface being cleaned.

The top, or upwardly facing outer layer of this sheet, maybe liquid impervious in order to minimize loss of absorbed fluids. The top layer may further provide for releasable attachment of the cleaning sheet 15 to a cleaning implement. The top layer may be made of a polyolefinic film, such as LDPE.

In a third embodiment, a dry cleaning sheet 15 may be utilized in conjunction with the present invention. A dry cleaning sheet 15 may comprise a nonwoven. The nonwoven may be synthetic and/or have cellulosic fibers therein. The synthetic fibers may comprise carded, staple, wet laid, air laid and/or spunbond fibers. The nonwoven cleaning sheet 15 may be made according to a hydro-entangling process to provide a texture and a basis weight of about 20 to about 120 gsm.

Optionally, the dry cleaning sheet 15 may further comprise an additive, to improve cleaning performance and/or enhance the cleaning experience. The additive may comprise wax, such as microcrystalline wax, oil, adhesive, perfume and combinations thereof. The cleaning sheet 15 according to the present invention may be made according to commonly assigned U.S. Pat. Nos. 6,305,046; 6,484,346; 6,561,354; 6,645,604; 6,651,290; 6,777,064; 6,790,794; 6,797,357; 6,936,330; D409,343; D423,742; D489,537; D498,930; D499,887; D501,609; D511,251 and/or D615,378.

The cleaning sheet 15 and/or scrubbing strip 10 according to the present invention may be used with a stick-type cleaning implement. The cleaning implement may comprise a plastic head for holding the cleaning sheet 15 and an elongate handle articulably connected thereto. The handle may comprise a metal or plastic tube or solid rod.

The head may have a downwardly facing surface, to which the cleaning sheet 15 may be attached. The downwardly facing service may be generally flat, or slightly convex. The head may further have an upwardly facing surface. The upwardly facing surface may have a universal joint to facilitate connection of the elongate handle to the head.

The upwardly facing surface may further comprise a mechanism, such as resilient grippers, for removably attaching the cleaning sheet 15 to the implement. If grippers are used with the cleaning implement, the grippers may be made according to commonly assigned U.S. Pat. Nos. 6,305,046; 6,484,346; 6,651,290 and/or D487,173. Alternatively, a hook and loop system and/or adhesive may be used to attach the cleaning sheet 15 to the head.

If desired, the cleaning implement may have an axially rotatable beater bar and/or vacuum type suction to assist in removal of debris from the target surface. Debris removed from the target surface may be collected in a dust bin. The dust bin may be mounted within the head, or, alternatively, on the elongate handle.

A suitable stick-type cleaning implement may be made according to commonly assigned U.S. Pat. Des. 391,715; D409,343; D423,742; D481,184; D484,287; D484,287 and/or D588,770. A suitable vacuum type cleaning implement may be made according to the teachings of U.S. Pat. Nos. 7,137,169, D484,287 S, D615,260 S and D615,378 S. A suitable motorized cleaning implement may be made according to commonly assigned U.S. Pat. No. 7,516,508.

If desired, the cleaning implement may further comprise a reservoir for storage of cleaning solution. The reservoir may be replaced when the cleaning solution is depleted and/or refilled as desired. The reservoir may be disposed on the head or the handle of the cleaning implement. The neck of the reservoir may be offset per commonly assigned U.S. Pat. No. 6,390,335. The cleaning solution contained therein may be made according to the teachings of commonly assigned U.S. Pat. No. 6,814,088.

The cleaning implement may further comprise a pump for dispensing cleaning solution from the reservoir onto the target surface, such as a floor. The pump may be battery powered or operated by line voltage. Alternatively, the cleaning solution may be dispensed by gravity flow or manually powered, as occurs with a trigger pump sprayer. The cleaning solution may be sprayed through one or more nozzles to provide for distribution of the cleaning solution onto the target surface in an efficacious pattern.

If a replaceable reservoir is utilized, the replaceable reservoir may be inverted to provide for gravity flow of the cleaning solution. Or the cleaning solution may be pumped to the dispensing nozzles. The reservoir may be a bottle, and may be made of plastic, such as a polyolefin. The cleaning implement may have a needle to receive the cleaning solution from the bottle. The bottle may have a needle pierceable membrane, complementary to the needle, and which is resealed to prevent undesired dripping of the cleaning solution during insertion and removal of the replaceable reservoir.

A suitable reservoir and fitment therefor may be made according to the teachings of commonly assigned U.S. Pat. Nos. 6,386,392; 7,172,099; D388,705; D484,804; D485,178. A suitable cleaning implement may be made according to the teachings of commonly assigned U.S. Pat. Nos. 5,888,006; 5,960,508; 5,988,920; 6,045,622; 6,101,661; 6,142,750; 6,579,023; 6,601,261; 6,722,806; 6,766,552; D477,701 and/or D487,174.

Figure 2:
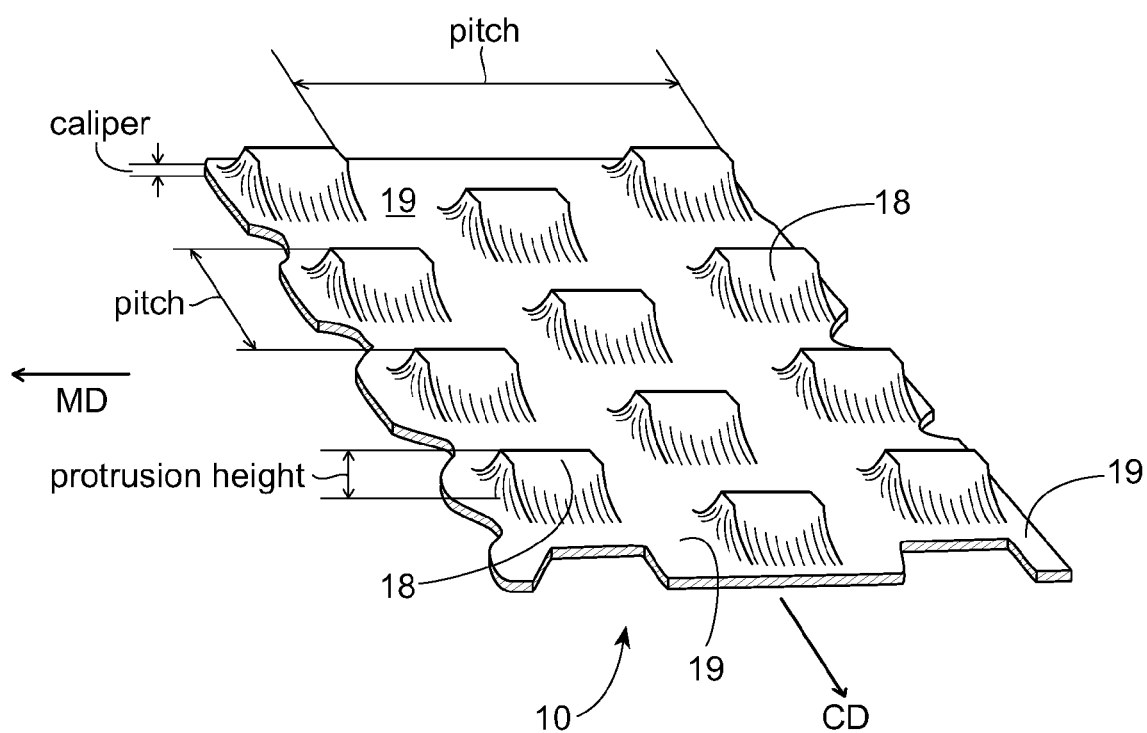
FIG. 2 is a perspective view of a scrubbing strip according to the present invention.

Referring to FIG. 2, the scrubbing strip 10 may be used alone or may be the portion of the optional cleaning sheet 15 which provides for more aggressive cleaning of the target surface. A suitable scrubbing strip 10 may comprise a nonwoven, a polyolefinic film, etc., and have outwardly extending protrusions 18. The protrusions 18 accomplish much of the aggressive cleaning and scrubbing described herein.

The surface layer is the lower layer of the cleaning sheet 15, contacts the soiled surface during cleaning, and interacts with the soil and the cleaning solution. As such, materials useful as the surface layer must be sufficiently durable that the layer will retain its integrity during the cleaning process. In addition, when the cleaning sheet 15 is used in combination with a solution, the surface layer may absorb liquids and soils, and transport those liquids and soils to the absorbent layer. The surface layer will, in addition to removing particulate matter, facilitate other functions, such as polishing, dusting, disinfecting, sanitizing and/or buffing the target surface being cleaned or otherwise treated.

The surface layer may have the scrubbing strip 10 joined thereto. The scrubbing strip 10 may cover all of or only a portion of the surface layer. The scrubbing strip 10 may be coterminous with and have the same length as the long dimension of the surface layer. Alternatively, the scrubbing strip 10 may have a width ranging from 1 to 15 cm, and comprise 5 to 90 or 10 to 50 percent of the width of the sheet 15. Alternatively, the scrubbing strip 10 may comprise the entire area of the surface layer. Alternatively, the scrubbing strip 10 may extend throughout the long dimension of the cleaning sheet 15 and be generally centered thereon.

Of course, one of skill will recognize that plural scrubbing strips 10 may be used with the surface layer of the present invention. The plural scrubbing strips 10 may be identical, similar or very different. For example, a more aggressive scrubbing strip 10 may be disposed near one edge of the sheet 15 and a less aggressive scrubbing strip 10 may be disposed near the center of the sheet 15, or vice versa. The scrubbing strip(s) 10 may match the color of the balance of the cleaning sheet 15 or may be of a contrasting color(s) to provide a signal to the user that the scrubbing strip(s) 10 is/are available for more vigorous cleaning.

The plural scrubbing strips 10 may be of like or different geometries, so that different scrubbing strips 10 may have different efficacies for various types of debris to be cleaned. If plural scrubbing strips 10 are utilized, the scrubbing strips 10 may be of like or different colors, at least one of which contrasts in color with the color of the cleaning sheet 15.

While a generally straight and high aspect ratio rectilinear scrubbing strip 10 is shown, one of skill will recognize the invention is not so limited. One or more scrubbing strips 10 may be generally square, chevron shaped, round, comprise a checkerboard pattern, be linear having variable width, combinations thereof, etc.

The scrubbing strip 10 may be macroscopically planar. The scrubbing strip 10 may have a caliper, exclusive of any outwardly extending protrusion 18. The caliper is thickness of the scrubbing strip 10 prior to the formation of the protrusion 18 thereon, or as taken in an area exclusive of any protrusion 18. Thus, the caliper may be thought to refer to a background 19 from which the protrusion 18 extends.

The background 20 may be thought of as being continuous, while the protrusion 18 may be thought of as being discrete and spaced apart from adjacent protrusions 18. Alternatively, the protrusions 18 may be semi-continuous, as occurs with ridges. The semi-continuous ridges may extend completely or partially throughout the length or width of the scrubbing strip 10.

As used herein, the caliper refers to the thickness of the background 19 or areas not having protrusions 18, while the surface roughness measurements refer to the height of the protrusion 18, as extending outwardly from a proximal end disposed on the background 19 to a distal end remote therefrom.

The scrubbing strip 10 may prophetically comprise a macro-apertured laminate of a thermoplastic formed film. As used herein, macro-apertures are apertures that are individually discernable when viewed by the human eye from about 45 cm. The macro-apertures may be, but not limited thereto, round, oval, pentagonal, hexagonal, octagonal, rectangular, square or other shapes. The macro-apertures may be created, for example, by thermo-mechanically perforating a polyolefinic film, such as a formed film.

As used herein, "formed film" means a film which is extruded onto a forming screen. In making a formed film, a thermoplastic material may be extruded from a cast die or blown die into a thin film. While the film material is semi-molten/malleable a differential pressure is applied by vacuum, positively blown air, water, etc. to the film material. This pressure may cause the film material to form into and conform to a textured screen. Texture may be imparted by the screen to provide topography to film. If desired, the scrubbing strip 10 may be perforated to provide apertured protrusions 18. Or, if desired, the scrubbing strip 10 may have protrusions 18 which are not perforate. The scrubbing strip 10 may be provided with a micro-texture and macro-texture as described in 2004/0161586 published Aug. 19, 2004.

The protrusions 18 may be disposed in a nonrandom, repeating pattern. The protrusions 18 may be unilaterally staggered or bilaterally staggered. The protrusions 18 may be round, square, rectangular, oval or of any other desired shape. The protrusions 18 may have an aspect ratio, defined as the ratio of the height of the protrusion 18 to the major dimension of the protrusion 18 parallel to the plane of the strip, ranging from 0.19 to 1 and particularly from 0.16 to 1.

The protrusions 18 may be discrete and spaced apart from adjacent protrusions 18. The protrusions 18 may have a height of at least 0.5, 1 or 1.5 mm, but less than 5, 3 or 2.5 mm. The scrubbing strip 10 may comprise from 25 to 45, or from 30 to 40 and particularly 36 protrusions 18 per 25 square cm.

The orientation of the major axis of the protrusions 18 relative to the stroke direction of the user during cleaning is not critical. Grout lines, texture in tile, grooves in linoleum flooring, etc. typically occur in both the longitudinal and transverse directions. Thus, whether the major axis is aligned in the longitudinal direction of the cleaning sheet 15, transverse direction, is skewed or diagonal relative thereto, is immaterial.

The scrubbing strip 10 may comprise, consist of or consist essentially of nonwoven synthetic materials such as polyolefins (e.g., polypropylene and polyethylene including LDPE), polyesters, polyamides, synthetic cellulosics, e.g. Rayon, and blends thereof. Such synthetic materials may be manufactured using known process such as being carded, spunbond, meltblown, airlaid, needlepunched and the like. Particularly, the scrubbing strip 10 may comprise polyester or polyethylene terephthalate (PET), collectively referred to herein as polyester and encompassing both.

A suitable nonwoven for the scrubbing strip 10 may be made of spunbonded polyester, such as is available from Fiberweb (London, England) under the name Reemay® 2214. Prophetically, the scrubbing strip 10 may be made of a PET nonwoven material having round fibers. The scrubbing strip 10 may have a basis weight ranging from 40 to 60 gsm, and may particularly be 46 gsm. The nonwoven material may have a denier ranging from 1.5 to 4 and particularly may be 2.2 denier. The nonwoven material may have a MD elongation at break ranging from 80 to 150 percent, 100 to 130 percent or 110 to 120 percent. It has been found that a scrubbing strip 10 having an elongation outside either limit of the broadest aforementioned range does not produce efficacious cleaning.

The scrubbing strip 10 may comprise a single lamina. By single lamina, it is meant that two formed and independent strata are not joined together in face-to-face relationship. Instead, a single ply is utilized. It is understood that the single ply may comprise plural layers of fibers therein.

One or more of the scrubbing strip 10 may be colored, or printed with graphics, brand information, Trademarks, usage instructions, and the like. The scrubbing strip 10 may be disposed on the cleaning sheet 15 positioned such that the scrubbing strip 10 is in direct contact with the absorbent layer, and the scrubbing strip 10 can contact the surface to be cleaned. The scrubbing strip 10 may facilitate fluid transport into the absorbent layer, and as such may reduce the tendency to allow liquids to pass back through and rewet the surface being cleaned. If plural scrubbing strip 10 are utilized, they may be of like or different appearance and/or functionality.

Figure 3:
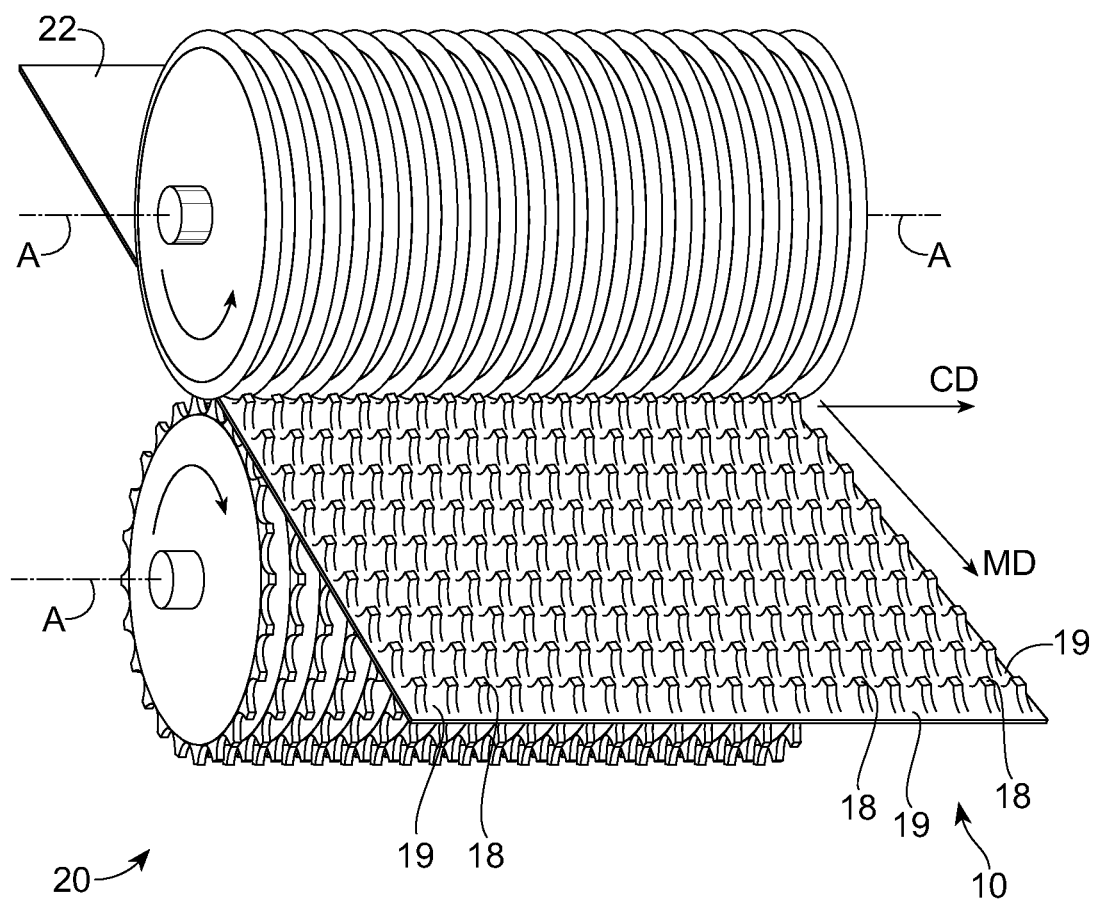
FIG. 3 is a schematic perspective view of one apparatus suitable for producing a scrubbing strip according to the present invention.
Figure 4A:
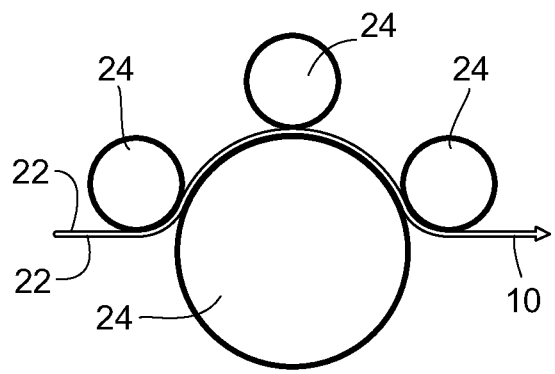
FIGS. 4A, 4B, 4C and 4D are schematic side elevational views of alternative apparatus suitable for producing a scrubbing strip according to the present invention.
Figure 4B:
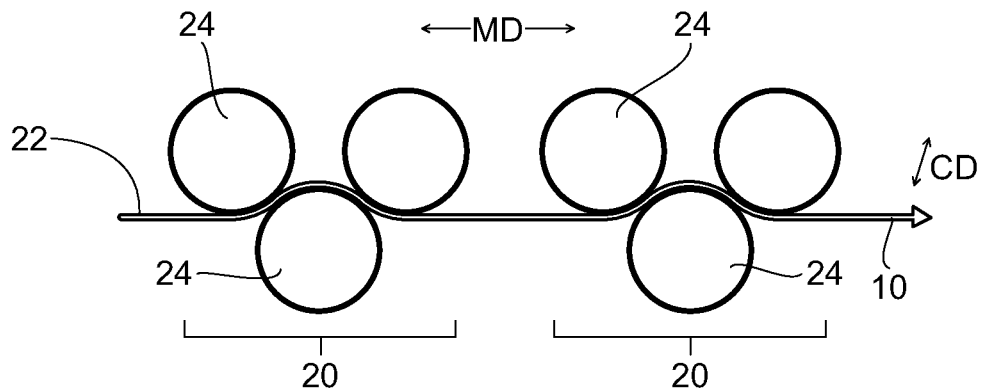
Figure 4C:
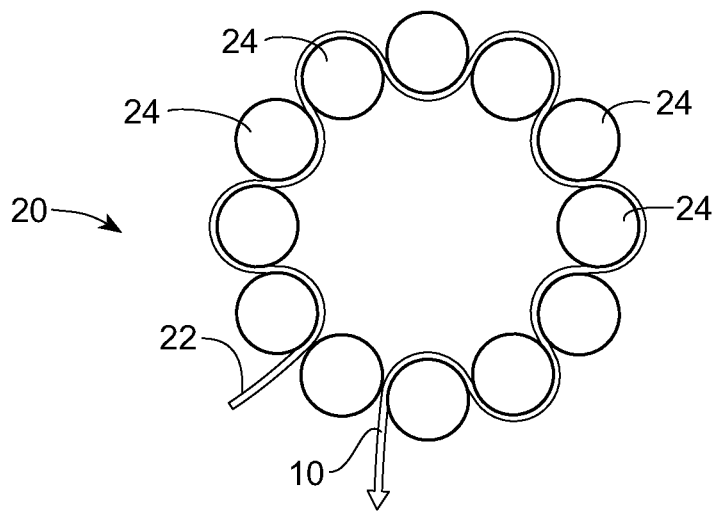
Figure 4D:
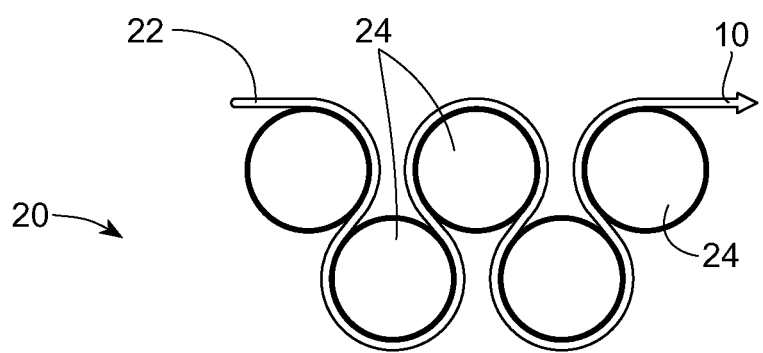

Referring to FIG. 3, the scrubbing strip 10 may formed from a generally planar, two dimensional nonwoven precursor web 22 using an apparatus 20 as shown. The apparatus 20 may be oriented for continuous web processing with respect to a machine direction (MD) and having a cross machine direction (CD) as is commonly known in the art of nonwoven webs.

If desired, a nonwoven scrubbing strip 10, or a scrubbing strip 10 made of other material, may be made by passing the material through interengaged forming rolls 24 having axially spaced, alternating radial teeth and intervening grooves, as illustrated in commonly assigned U.S. Pat. No. 6,383,431. If desired, a zero-strain laminate may be used for the scrubbing strip 10, as disclosed in commonly assigned U.S. Pat. No. 5,143,679.

The apparatus 20 may particularly comprise a pair of rolls 24, each rotating about parallel axes A. The apparatus 20 may comprise a pattern roll 24 and a bed roll 24. Such an apparatus 20 may be similar to the apparatus 20 described in commonly assigned U.S. Pat. Nos. 5,916,661; 5,628,097 and 5,518,801 issued to Chappell et al. and U.S. 2004/0127875 published in the name of Hammons et al. The apparatus 20 may comprise a roll 24 having a plurality of circumferentially-extending ridges separated by grooves, as disclosed in the above-mentioned patents and is well known in the art of "ring rolling." One roll 24 of the apparatus 20 may have toothed ridges separated by grooves. The ridges of the pattern roll 24 intermesh with the grooves of the facing roll 24 to form the protrusions 18.

If a single pattern roll 24 and bed roll 24 are used, the pattern roll 24 may provide a depth of engagement ranging from 3.1 to 3.5 mm, particularly from 3.2 to 3.4 mm. A single pattern roll 24/bed roll 24 apparatus 20 may be run at a line speed ranging from 5 to 1000 meters per minute and may particularly be 260 meters per minute.

Referring to FIGS. 4A, 4B, 4C and 4D, if desired, the apparatus 20 may comprise a single bed roll 24 with a plurality of pattern rolls 24 circumferentially spaced therearound. Or the apparatus 20 may comprise plural pattern rolls 24 and plural bedrolls 24. One, two, three, four or more pattern rolls 24 equally or unequally spaced apart may be utilized. The apparatus 20 line speed may range from 120 to 300 meters per minute.

Each pattern roll 24 may provide successively deeper engagement between the nubs of that pattern roll 24 and the bed roll 24. By deforming the protrusions 18 of the scrubbing strip 10 in plural steps, rather than in a single step, it is believed the protrusions 18 have improved stiffness and resiliency, and thereby provide improved cleaning. In one exemplary embodiment, the pattern rolls 24 may provide successively increasing depths of engagement of 1.9, 2.0 and 3.2 mm, respectively. The process of making a scrubbing strip 10 using plural deformation steps, by, for example, using plural pattern rolls 24 to successively deform the protrusions 18 more deeply is hereinafter referred to as a multi-hit deformation process.

The pattern rolls 24 may have nubs of otherwise identical size and spacing. The nubs, and resulting protrusions 18, may be unilterally staggered or bilaterally staggered. The nubs may have a height ranging from 1.5 to 2.5 mm. The nubs may have a length in the MD ranging from 5 to 7 mm. The nubs may be spaced on a pitch ranging from 1.5 to 5 mm, and particularly 4 mm in the CD and 4 to 15 mm, and particularly 12 mm in the MD. The nubs may or may not pierce the scrubbing strip 10 material to form an apertured or nonapertured scrubbing strip 10, as desired.

One advantage of the apparatus 20 described above is that the scrubbing strip 10 can be produced in-line with other production equipment on a manufacturing line for producing such articles. For example, an apparatus 20 such as disclosed above, can be made as a unit operation for an existing manufacturing line. As a unit operation, such apparatus 20 can be modular, so that it can be easily changed out. When used as part of a manufacturing line for cleaning pads, the constituent rolls 24 need not be much wider than the product itself, thereby providing for relatively easy installation and removal. Various patterns can therefore be implemented with a minimum interruption to production.

The height of the protrusions 18 of the scrubbing strip 10 is measured hereunder and quantified via computer-controlled fringe-projection optical profilometry. Optical profilometer systems measure the surface height of a sample, resulting in a map of surface height (z), versus lateral displacement in the x-y plane. The profilometer instrument should have a z-resolution of at least 0.001 mm/count; a maximum height range of at least −16.000 mm to +16.000 mm; a lateral field of view of at least 32 mm×42 mm; and a digital camera with at least 1,300×1,000 pixels, yielding an 8-bit grayscale image.

As set forth in commonly assigned application 2010/0028621 published Feb. 4, 2010, protrusion 18 height is measured using a GFM Primos Optical Profiler available from GFMesstechnik GmBH of Teltow, DE having micro-minors with blue LED's, or equivalent and running ODSCAD software version 4 or 6; also available from GFMessthechnik GmbH, Teltow, Germany.

Roughness parameters to be measured may include three line roughness measures, namely: Ra, Rq, and Rz, as well as three surface roughness measures, namely: Sa, Sq, and Sz. These measures are described below, and described in mathematical detail within the ODSCAD software manual.

Ra is the average of the absolute values of the profile heights on the line roughness profile.

Rq is the root mean square average of the profile heights on the line roughness profile.

Rz is the average of the single roughness depths, ie the difference from the highest profile peak to the deepest profile valley on a single line roughness profile.

Sa is the average of the absolute values of the profile heights within the area measured.

Sq is the root mean square average of the profile heights within the area measured.

Sz is the average of the sums of the five highest profile peaks and the five lowest profile valleys within the area measured.

Samples should be equilibrated at 23° C.+/−2 C.° and 50% +/−2% relative humidity for at least 2 hours immediately before testing, or prior to acquiring measurements. Samples of either finished-product cleaning sheet 15, or of scrubbing strip 10 material, can be measured. For either sample type, the area of scrubbing strip 10 in each sample will ideally have a first dimension of at least 200 mm and a dimension perpendicular thereto of at least 200 mm. If the area of scrubbing strip 10 within the sample is smaller than these ideal dimensions then the maximum size feasible for each dimension is utilized, while restricting the measurement to solely the area of scrubbing strip 10 material having protrusions 18, and excluding other areas which might be present on the cleaning sheet 15.

If the sheet 15 is pre-wetted as presented to the user, the sheet 15 is dried before testing. Drying may be accomplished by laying the sheet 15 on a flat, horizontal surface with the scrubbing strip 10 facing upwards. The room in which the sheet 15 is dried to is kept at conditions of 23+/−2 C.° and a RH of 50+2 percent. The sheet 15 is dried until dry to the touch.

The sample to be measured is placed with the floor-facing cleaning surface upward, underneath and normal to, the profilometer's projection head. The sample is to be laying flat and not stretched. The sample within the field of view is then covered entirely by a sheet of glass nominally 2 mm thick. The glass sheet is to be not more than 10 percent larger in XY dimensions than the corresponding XY dimension of the instrument field of view.

Any portion of the image that is not a part of the scrubbing strip 10 should be cropped out of the captured image. Such cropping must occur prior to any further image processing, filtering or measurement analysis. The size of the resultant cropped image may vary between samples and images, depending upon the dimensions of the scrubbing strip 10 sample. Cropping should be kept to a minimum, so that the image is kept as large and accurately representative of the scrubbing strip 10 as possible.

The images are processed in the ODSCD software prior to image analysis to lightly smooth noise in the images caused by the irregularity/waviness of the sample. This processing/pre-filtering routine includes the removal of invalid pixels (those black pixels having a grey value of 0), the removal of peaks (those very bright pixels identified by the software as statistical outliers). For the surface area measurements, a polynomial highpass filter is utilized with settings of: (n=4, Difference). When measuring surface roughness parameters of Sa, Sq, and Sz the following software settings are utilized: Area Filter: Automatic Alignment=0; Gaussian filter=0; Wave filter Nach DIN 4768=0. Filter shape: circle; Scope: all files.

For line roughness measurements a 3×3 pixel Gaussian filter is run. When measuring the line roughness parameters of Ra, Rq and Rz the following software settings are used: (Area Filter:Automatic Alignment=0; Wave filter Nach DIN 4768=1; Filter shape: circle; Scope: All files). For line roughness measurements, within each cropped image plural straight measurement lines are created which are oriented lengthwise in the sample cross-direction as discussed below.

These measurement lines are located such that each line crosses the highest peak of protrusion(s) 18, and the valley(s) between protrusion(s) 18. In each image, a total of 20 protrusions 18 and 20 valleys should be measured for vertical distance via line roughness. For samples containing more than one type or shape of protrusion 18 each type is to be measured and reported separately. In this case measurement lines are to be located such that only one type of protrusion 18 is recorded within any line measurement result. After defining the lines, the evaluation is started and line roughness parameters Ra, Rq and Rz are calculated within each image.

For line roughness measurements, within each field of view, multiple straight measurement lines are created and are oriented lengthwise across the sample. These measurement lines are located such that each line crosses the highest peak of at least three protrusions 18, and three valleys between these protrusions 18.

For each material to be tested, ten samples are measured, with one image per sample being captured. For each parameter calculated, the values from each of the 10 images are averaged together to give the final value for each parameter, for each material. The values are noted as being from either finished product or from raw material. For line roughness values the protrusion 18 type is also noted if more than one type was present in that material Elongation is measured by providing a test sample having a width of 50±0.5 mm and a gage length of more than 200 mm, so that the jaws can start from a position 200 mm apart. The gage length is taken parallel to the longest dimension of the scrubbing strip 10 as presented to the user. The sample includes the scrubbing strip 10, exclusive of any pad to which the scrubbing strip 10 may have been attached.

The sample is placed in the tensile machine with the cross heads set 200±1 mm apart. The cross heads are separated at a rate of 100 mm per min. The elongation at break is recorded. Five samples are tested in this manner. The elongation is the average of those five samples.

EXAMPLES

A commercially successful cleaning sheet 15 having a scrubbing strip 10 as sold by the instant assignee under the Swiffer® Wet Mopping Refill brand is used as a control representing prior art. Other scrubbing strip 10 not found in the art were tested. The control scrubbing strip 10 and the scrubbing strip(s) 10 according to the present invention were used in conjunction with a Swiffer WetJet® cleaning sheet 15 sold by the instant assignee.

Each sheet 15 having the scrubbing strip 10 under consideration was tested using a Swiffer WetJet® implement. Nine ceramic tiles arranged in a 3×3 grid were provided. The gloss of the test surface was determined using an LAB measurement.

The tiles were soiled with a predetermined amount of dirt, dust and crumbs to form a test surface. The test surface was sprayed with a predetermined amount of cleaning solution. The cleaning solution had an aqueous base with surfactant. Each test surface was scrubbed with the sample being tested, attempting were made to make the cleaning strokes as consistent as possible for each sample tested.

After the test surface was cleaned with the scrubbing strip under consideration, the gloss was re-measured. The improvement in cleanliness was recorded on a subjective scale ranging from 0-3, using the differential gloss measurement and reported as the Cleaning Index.

Table 1 below shows the Sa surface roughness values for 13 different samples of scrubbing strip 10 material. Values which are not statistically different at the 95 percent confidence level overlap in a single row. E.g. Trial samples 6, 7 and 8 are not statistically significantly different. Entries 1-3 are scrubbing strip 10 according to the present invention. Entries 4-12 are scrubbing strip 10 made by the instant assignee and not having surface roughness values according to the present invention. Entry 13 is a commercially available cleaning sheet 15 sold by the instant assignee under as Swiffer Wet Floor sheets. The cleaning values associated with these samples are found in FIG. 5.

Table 2 below shows the corresponding Sq surface roughness values for the 13 samples represented in Table 1. The cleaning values associated with these samples are found in FIG. 6. Table 3 below shows the corresponding Sz surface roughness values for the 13 samples represented in Table 1. The cleaning values associated with these samples are found in FIG. 7.

TABLE 1

| Sample | A | B | C | D | E | F | G | H | Mean Sa Value | Cleaning Index |
|---|---|---|---|---|---|---|---|---|---|---|
| INVENTION | A | | | | | | | | 512 | 0.4 |
| INVENTION | A | | | | | | | | 499 | 2.4 |
| INVENTION | | B | | | | | | | 465 | |
| TRIAL | | B | | | | | | | 449 | 2.5 |
| TRIAL | | | C | | | | | | 372 | |
| TRIAL | | | C | D | | | | | 362 | |
| TRIAL | | | C | D | | | | | 351 | 1.8 |
| TRIAL | | | C | D | | | | | 349 | 2.1 |
| TRIAL | | | | D | | | | | 340 | 0.5 |
| TRIAL | | | | | E | | | | 304 | 0.9 |
| TRIAL | | | | | | F | | | 269 | |
| TRIAL | | | | | | | G | | 217 | 1.1 |
| PRIOR ART | | | | | | | | H | 184 | 0.4 |

TABLE 2

| Sample | A | B | C | D | E | F | G | H | I | Mean Sq value | Cleaning Index |
|---|---|---|---|---|---|---|---|---|---|---|---|
| INVENTION | A | | | | | | | | | 726 | 2.4 |
| INVENTION | | B | | | | | | | | 634 | |
| TRIAL | | B | C | | | | | | | 621 | 0.4 |
| TRIAL | | | C | D | | | | | | 584 | 2.5 |
| TRIAL | | | | D | | | | | | 558 | |
| TRIAL | | | | | E | | | | | 512 | 1.8 |
| TRIAL | | | | | E | F | | | | 485 | 2.1 |
| TRIAL | | | | | | F | G | | | 469 | 0.5 |
| TRIAL | | | | | | F | G | | | 457 | |
| TRIAL | | | | | | | G | | | 434 | 0.9 |
| TRIAL | | | | | | | | H | | 344 | |
| PRIOR ART | | | | | | | | H | | 342 | 1.1 |
| TRIAL | | | | | | | | | I | 228 | 0.4 |

TABLE 3

| Sample | A | B | C | D | E | F | G | Mean Sz Value | Cleaning Index |
|---|---|---|---|---|---|---|---|---|---|
| INVENTION | A | | | | | | | 5249 | 2.4 |
| INVENTION | | B | | | | | | 4770 | 1.8 |
| INVENTION | | B | | | | | | 4733 | |
| TRIAL | | | C | | | | | 3776 | |
| TRIAL | | | C | D | | | | 3507 | 2.1 |
| TRIAL | | | C | D | | | | 34745 | 1.1 |
| TRIAL | | | | D | | | | 3140 | 2.5 |
| TRIAL | | | | D | | | | 3110 | 0.9 |
| TRIAL | | | | D | | | | 3105 | 0.5 |
| TRIAL | | | | | E | | | 2591 | 0.4 |
| TRIAL | | | | | | F | | 2056 | |
| TRIAL | | | | | | F | | 1741 | |
| PRIOR ART | | | | | | | G | 1192 | 0.4 |

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A scrubbing strip usable for cleaning a target surface, said scrubbing strip comprising:
   a macroscopically planar, single ply strip of material having an elongation at break of 80 percent to 150 percent, and a background with protrusions extending outwardly therefrom, said protrusions having an Sz Surface Roughness of 4000 to 6000 micrometers.

2. A scrubbing strip according to claim 1, wherein said protrusions are non-apertured.

3. A scrubbing strip according to claim 2, wherein said Sz Surface Roughness is from 5000 to 6000 micrometers.

4. A scrubbing strip according to claim 3, further having a Sq Surface Roughness of 700 to 800 micrometers.

5. A scrubbing strip according to claim 4, made according to the process comprising the step of using a plurality of pattern rolls to form each said protrusion.

6. A scrubbing strip usable for cleaning a target surface, said scrubbing strip comprising:
   a macroscopically planar, single ply nonwoven strip of material having an elongation at break of 80 to 150 percent, and having a background with discretely spaced apart protrusions extending outwardly therefrom, said protrusions having an Sq Surface Roughness of 700 to 800 micrometers.

7. A scrubbing strip according to claim 6, having a first plurality of protrusions which are apertured and a second plurality of protrusions which are not apertured.

8. A scrubbing strip according to claim 7 having a basis weight from 40 to 60 gsm.

9. A scrubbing strip according to claim 8, wherein said scrubbing strip further has a Sz surface roughness of 4000 to 6000 micrometers.

10. A scrubbing strip according to claim 9, comprising from 30 to 40 protrusions per square centimeter.

11. A scrubbing strip according to claim 10 having an Sq Surface Roughness of 750 to 800 micrometers.

12. A cleaning sheet usable for cleaning a target surface, said cleaning sheet comprising:
an absorbent layer;
a surface layer joined to said absorbent layer, said surface layer comprising material suitable for contacting a target surface and removing liquid therefrom for absorption by said absorbent layer, said surface layer having an outwardly facing first surface and a second surface opposed thereto, said second surface facing towards said absorbent layer; and
a macroscopically planar single ply polyester nonwoven scrubbing strip joined to said first surface whereby said scrubbing strip can also contact the target surface, said scrubbing strip having a continuous background with discretely spaced apart protrusions extending outwardly therefrom, said protrusions having an Sq Surface Roughness of 700 to 800 micrometers and an Sz Surface Roughness of 4000 to 6000 micrometers, said scrubbing strip having an elongation at break of 80 to 150 percent and being made according to a multi-hit deformation process.

13. A cleaning sheet according to claim 12, said cleaning sheet being white, and said scrubbing strip having a color contrasting with said white cleaning sheet.

14. A cleaning sheet according to claim 13 and having a scrubbing strip made according to the process comprising the steps of providing a precursor web, passing said precursor web through a first nip formed between a pattern roll and a bed roll to form scrubbing strip having a plurality of protrusions having a first protrusion height, passing said scrubbing strip through a second nip formed between a pattern roll and a bed roll to increase the height of said protrusions to a second protrusion height greater than said first protrusion height, and attaching said scrubbing strip to the balance of said cleaning sheet.

15. A cleaning sheet according to claim 14 and having a scrubbing strip made according to the process further comprising the steps of passing said scrubbing strip through a third nip formed between a pattern roll and a bed roll to increase the height of said protrusions to a third protrusion height greater than said second protrusion height.

16. A cleaning sheet according to claim 12 wherein said scrubbing strip has a basis weight ranging from 40 to 60 gsm.

17. A cleaning sheet according to claim 16 wherein said scrubbing strip has an elongation at break ranging from 110 to 120%.

18. A cleaning sheet according to claim 17 wherein said scrubbing strip has an Sq Surface Roughness of at least 750 micrometers and an Sz Surface Roughness of at least 5000 micrometers.

19. A cleaning sheet according to claim 18 wherein said absorbent layer further comprises absorbent gelling material.

* * * * *